UNITED STATES PATENT OFFICE.

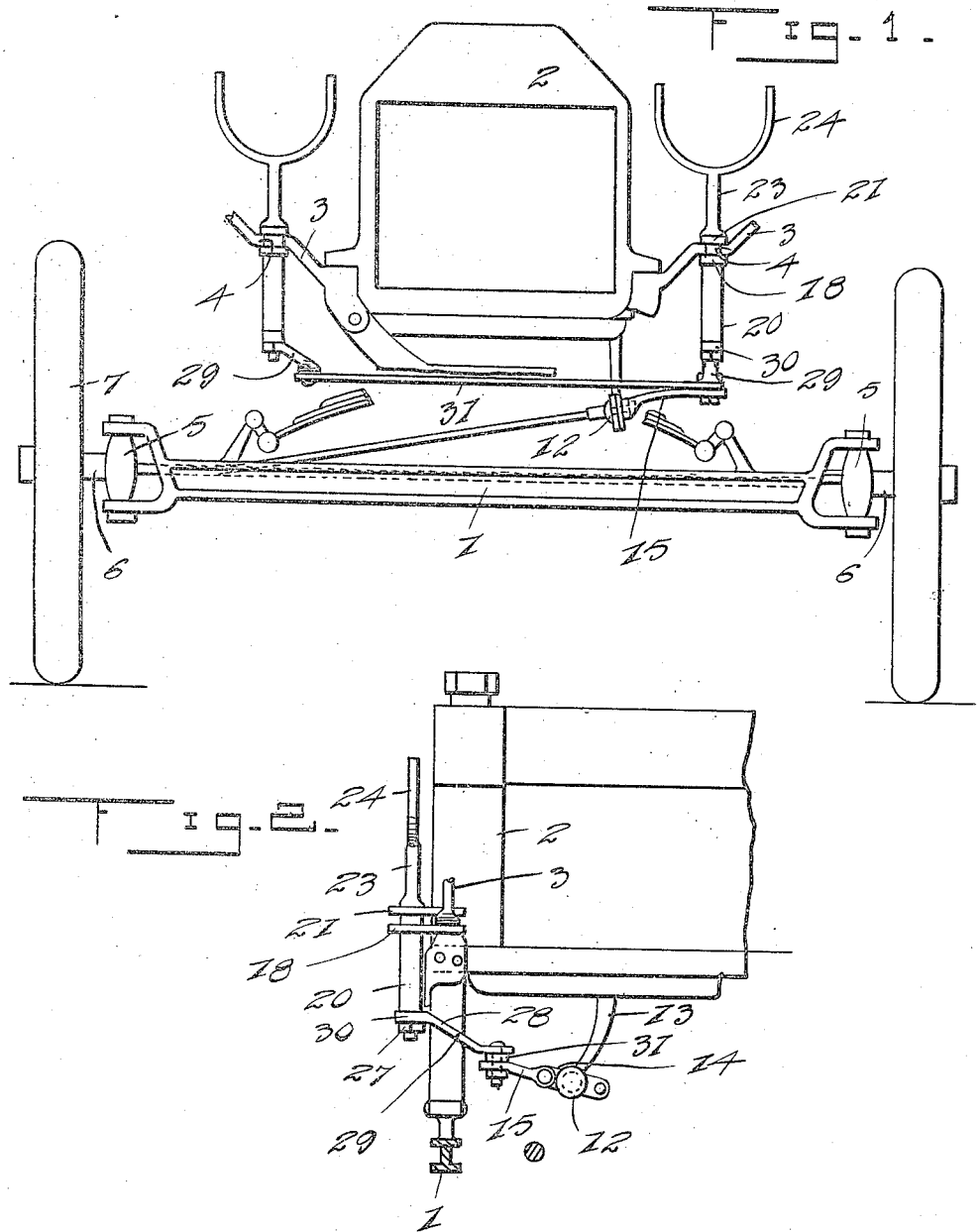

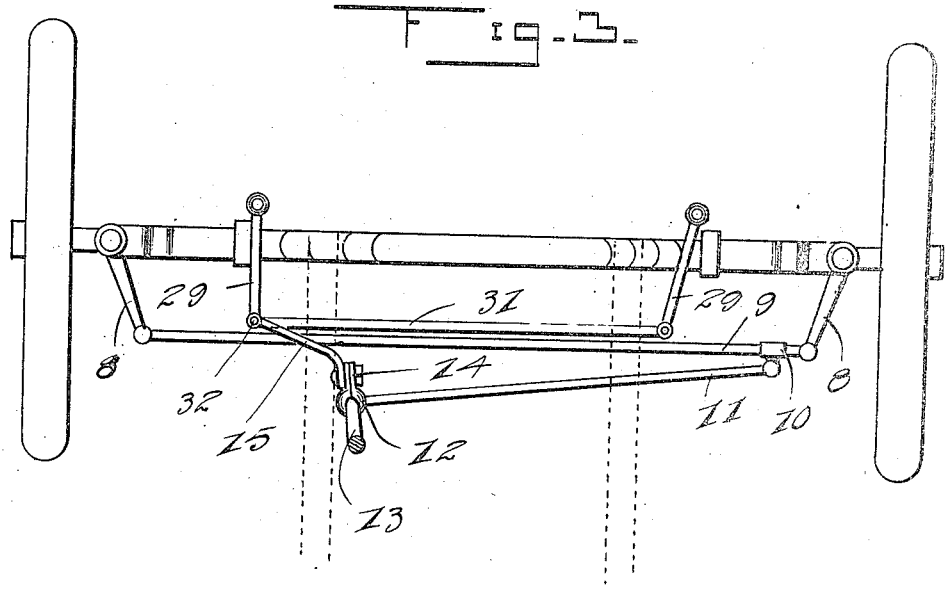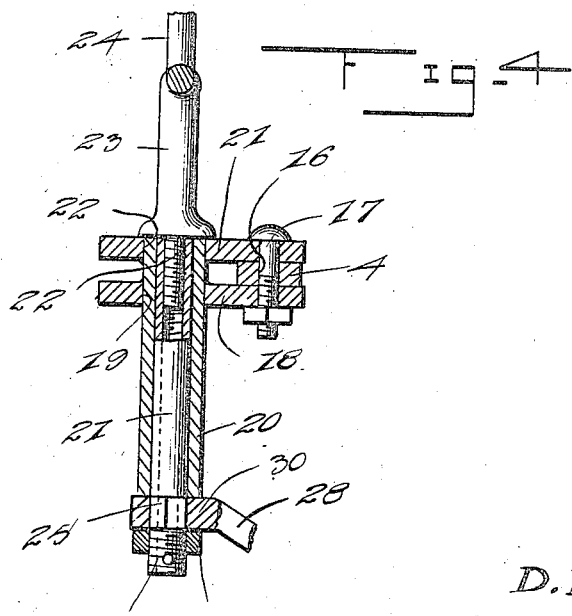

DOMENICO FORNIRASEO, OF KLAMATH FALLS, OREGON.

DIRIGIBLE AUTOMOBILE-HEADLIGHT.

1,215,016.  Specification of Letters Patent.  Patented Feb. 6, 1917.

Application filed March 1, 1916. Serial No. 81,496.

*To all whom it may concern:*

Be it known that I, DOMENICO FORNIRASEO, a citizen of the United States, residing at Klamath Falls, in the county of Klamath and State of Oregon, have invented certain new and useful Improvements in Dirigible Automobile-Headlights; and I do hereby declare the following to be a full, clear, and exact description of the invention, such as will enable others skilled in the art to which it appertains to make and use the same.

This invention relates to new and useful improvements in dirigible automobile headlights and the principal object of the invention is to provide a device which will cause the lights to turn upon the operation of the steering gear.

Another object of the invention is to provide a device which will illuminate the roadway at all times regardless of whether the operator is turning a corner or traveling in a straight away path.

A still further object of the invention is to provide a novel means for mounting the headlights so that they may be readily turned.

With these and other objects in view, the invention consists in the novel combination and arrangement of parts which will be fully set forth in the following specification and accompanying drawings, in which:—

Figure 1 is a front view in elevation of a vehicle illustrating this invention applied thereto, portions of the vehicle being broken away to more clearly illustrate the details of construction.

Fig. 2 is a fragmentary side view of Fig. 1 showing the axle and steering rod in section and illustrating the center removed.

Fig. 3 is a top plan view of the axle illustrating the steering connection and the relative position of the controlling arm of the lamp, and Fig. 4 is a vertical sectional view on an enlarged scale through the lamp supporting structure.

Referring to the drawings, the numeral 1 designates the front axle of the vehicle while the numeral 2 designates the radiator, 3 designates the supporting arms for the fenders and each of these arms is provided with the angularly disposed portions 4 as in the ordinary way. The knuckle joints are designated by the numeral 5 and carry the spindles 6 on which the wheels 7 are rotatably mounted and these knuckle joints are each provided with the rearwardly extending arm 8 to which the connecting rod 9 is pivotally connected. This connecting rod is provided with a sleeve 10 near one end to which is pivotally connected the operating rod 11 which is connected at its opposite end to the swivel joints 12 of the arm 13 which is moved laterally by the operation of the steering wheel. The swivel joint 12 is provided with a forwardly extending ear 14 to which the arm 15 is connected and this arm extends outwardly and forwardly as shown in Fig. 3 and is pivotally connected at its end to the rear terminal of the lamp controlling arms which will be more fully hereinafter described.

The portion 4 of each of the fender supporting arms 3 is apertured as at 16 and is adapted to receive the bolt 17 by means of which the lamp attaching bracket is secured in place. The attaching bracket above referred to comprises a plate 18 which is apertured as at 19 near its outer end and has secured in said aperture in any suitable manner the sleeve 20. A similar plate 21 coöperates with the plate 18, and is apertured as at 22 to receive the upper end of the sleeve and each of these plates is provided with an aperture for the reception of the bolt 17 so that the device may be assembled as illustrated in Fig. 4 with the plate 18 beneath the portion 4 of the arm 3, while the plate 17 is positioned on the upper side thereof. The sleeve 20 extends downwardly as shown and rotatably mounted in said sleeve is a hollow shaft 21 provided at its upper end with internal screw threads to receive the threaded boss 22 formed on the lower end of the stem 23 of the lamp socket. The upper end of the stem is provided with the upwardly extending horns or arms 24 as in the ordinary way and these horns partly embrace the lamp. The lower terminal of the hollow shaft 21 is squared as at 25 and is provided with the reduced threaded extension 26 on which the nut 27 is adapted to be threaded so as to hold the operating arm which will be more fully hereinafter described in place. In order to prevent the nuts 27 from working loose, a suitable cotter pin is inserted through an aperture formed in the lower terminal of the hollow shaft 21 and it will thus be seen that the possibility of the parts being accidentally disassembled is avoided.

The operating arms above referred to are designated by the numeral 28 and each comprises a body 29 provided at one end with the annularly extending ear 30 having a rectangular aperture formed therein for the reception of the squared portion 25 of the shaft 21. It will thus be seen that upon swinging the arm the shaft will be rotated. Formed at the rear end of the body 29 is a similar offset ear to which the connecting rod of the lamp designated by the numeral 31 is pivotally connected. It will thus be seen that upon movement of one of the lamps the lamp at the opposite side of the vehicle will be moved synchronously. In order that the lamps may be moved simultaneously with the operation of the steering gear, the outer end of the bar 15 is provided with an ear which is pivotally connected at 32 to one of the pivotal connections of the arm 29 with the connecting rod 31.

It will be apparent from the foregoing that upon movement of the steering gear the arm 13 will be caused to swing laterally thereby moving the arm 15 and causing the connecting rod 31 to move laterally thereby operating the arms 29 and swinging the same which causes the lamp brackets 23 to be revolved. Upon returning the steering gear to its original position, it will be evident that the lamp brackets will again turn thereby assuming their original relation with the vehicle.

While in the foregoing there has been shown and described the preferred embodiment of this invention, it is to be understood that such changes may be made in the combination and arrangement of parts as will fall within the spirit and scope of the appended claims.

What is claimed is:—

1. In a dirigible headlight, a plate having an aperture near its forward end, a sleeve secured in said aperture, a hollow shaft rotatably mounted in said sleeve, the upper end of the shaft being provided with internal screw threads, a lamp bracket, an external screw threaded downwardly extending boss formed on the lamp bracket arranged to enter the threaded portion of the shaft, a squared portion on the lower end of said shaft, an arm secured on the squared portion, means to hold the arm in position, arms at the upper end of the lamp bracket for supporting a lamp in place and means operatively connecting the arm secured on the squared portion of the shaft with the steering gear of a vehicle.

2. In a dirigible headlight, the combination with a fender support provided with a horizontal offset portion, of a plate arranged to engage the underside of said offset portion, said plate being provided with an aperture near its forward end, a coöperating plate arranged to engage the upper side of the offset portion, said upper plate being provided with an aperture adapted to register with the aperture in said lower plate, a sleeve secured in said apertures, and extending downwardly therefrom, means rotatably supported in said sleeve, a bolt extending through the plates and offset portions to hold the bracket in position, a lamp bracket carried by said rotatable means in said sleeve, and means operatively connected to said rotatable means in said sleeve and the steering gear of a vehicle.

In testimony whereof I affix my signature in presence of two witnesses.

DOMENICO FORNIRASEO.

Witnesses:
H. E. GETZ,
W. H. A. RENNER.